Oct. 12, 1943.  J. F. ANDERS  2,331,757
INTERNAL THREAD GAUGE
Filed Sept. 16, 1942  2 Sheets-Sheet 1
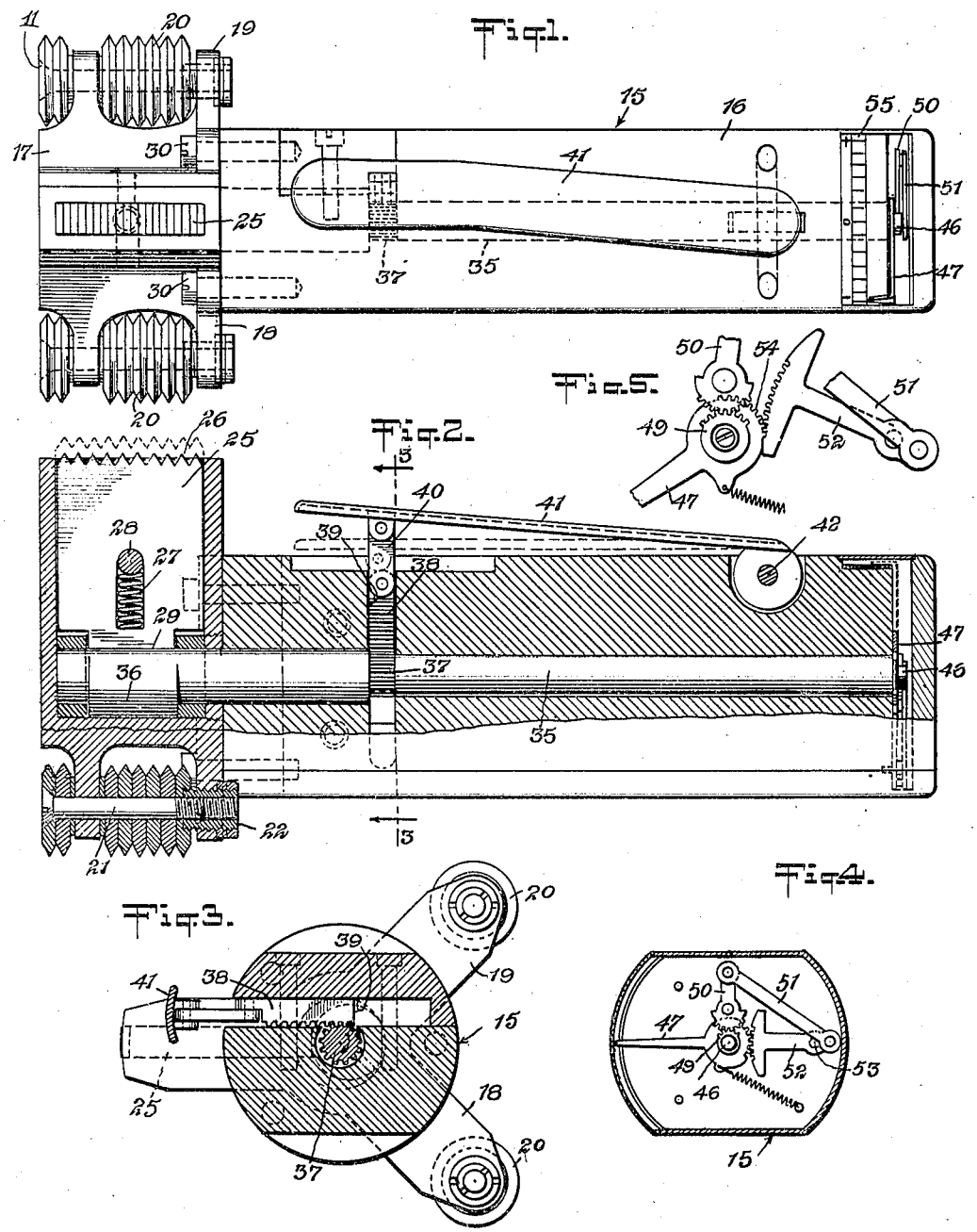
INVENTOR
John F. Anders

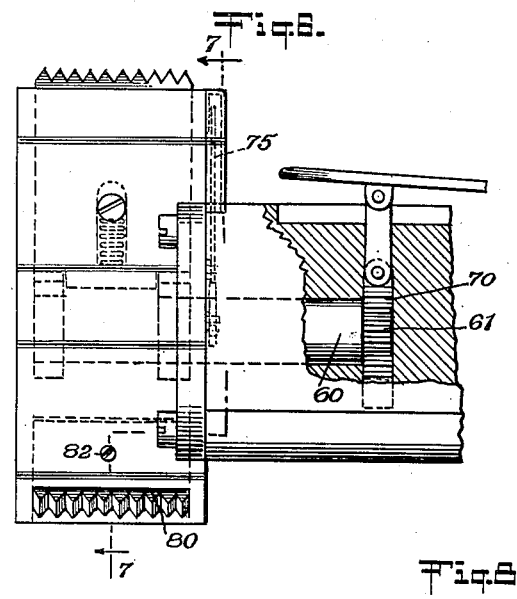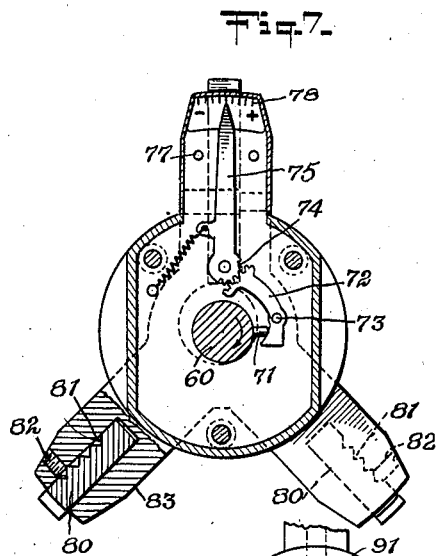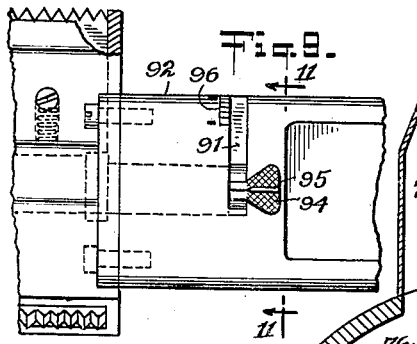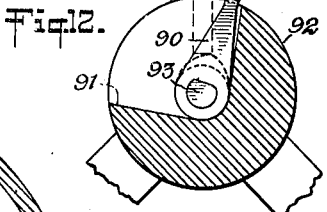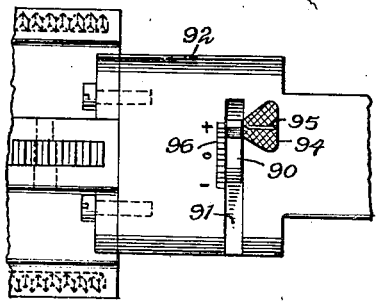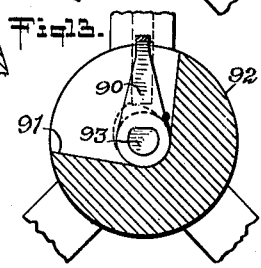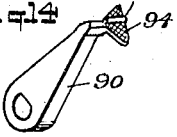

Patented Oct. 12, 1943

2,331,757

UNITED STATES PATENT OFFICE 2,331,757

INTERNAL THREAD GAUGE

John F. Anders, Kitchawan, N. Y.

Application September 16, 1942, Serial No. 458,487

2 Claims. (Cl. 33—199)

This invention relates to gauges, and more particularly to gauges for the measurement of internal diameters and particularly internal threads.

At the present time, internal threads are checked by means of plug gauges which consist of a plug accurately made and adapted to screw into the opening. It is impossible with such a gauge to ascertain whether or not the internal threads are accurate unless the inaccuracy is such that the plug gauge does not fit. Moreover, constant use of the plug gauge causes it to wear and become inaccurate.

An object of this invention is to provide an internal thread gauge with which the accuracies of internal threads may be tested to within one-thousandth of an inch, or parts thereof, and the amount of inaccuracy or variance likewise determined.

A further object is to provide a gauge which will not be subjected to excessive wear in use and in which any wear may be corrected by adjustment.

A further object is to provide a gauge which may be used within limits for different size openings and which, by means of interchangeable parts, may be used for testing a great number of different size openings.

Other objects and advantages become apparent as the description proceeds.

In the accompanying drawings—

Fig. 1 is a plan view of a gauge embodying my invention;

Fig. 2 is a side elevation, partly in cross section, of the gauge shown in Fig. 1;

Fig. 3 is a cross sectional view taken on the line 3—3 of Fig. 2;

Fig. 4 is a view of the indicating needle mechanism;

Fig. 5 is an enlarged view in detail of a portion of the indicating mechanism;

Fig. 6 is a sectional view of a modified form of gauge;

Fig. 7 is a cross sectional view taken on the line 7—7 of Fig. 6;

Fig. 8 is an enlarged detail view of a portion of the operating mechanism shown in Fig. 7;

Fig. 9 is a plan view of a further modification of my gauge;

Fig. 10 is a view similar to Fig. 9 showing the gauge in a different position;

Fig. 11 is a cross sectional view taken on the line 11—11 of Fig. 9;

Fig. 12 is a view similar to Fig. 11 with the operating lever in a different position;

Fig. 13 is a view similar to Figs. 11 and 12 with the operating lever in a still different position;

Fig. 14 is a perspective view of the operating lever.

My gauge 15 consists of a handle member 16 and an operating head 17. The operating head is provided with two fixed extending members 18 and 19, each carrying rolls 20. Rolls 20 may consists of independent rings or a solid member, as desired. The rolls 20 are held in the members 18 and 19 by means of a pin 21 and an internally threaded plug 22. It will be readily appreciated that these rolls may be removed, and other substituted, depending upon the threads to be tested.

Mounted in the head 17 is a segment 25 having teeth 26 adapted to conform with the threads to be tested. Segment 25 is positioned in the head by the spring 27 acting on the retaining pin 28 but is otherwise slidably mounted within the head. Segment 25 has a depending member 29, the purpose of which will be discussed later.

The head 17 is fastened to the operating handle 16 by means of screws 30 so that different heads may be fitted to the handle. Extending through the head and the handle is a shaft 35 having an eccentric 36 adapted to engage the end 29 of the segment 25. The shaft 35 is provided with teeth at 37 adapted to engage the rack 38 in the recess 39. Attached to the rack 38 by means of the link 40 is an operating lever 41 which is pivoted at 42 within the handle. It will be seen that, as the operating handle is pushed downwardly, the rack will engage the teeth 37 on the shaft 35 causing it to rotate while the eccentric 36 will engage the end 29 of the segment 25 to push it outwardly against the spring 27.

The end 46 of the shaft 35 is reduced, and loosely mounted thereon is the indicating needle 47. A toothed segment 49 is fixed to the end of the shaft 35 which engages the gear segment lever 50 which is linked by the link 51 to a second gear segment lever 52 pivoted at 53. The gear segment lever 52 engages teeth 54 on the indicating needle 47. The indicating needle registers on the the scale 55.

The gauge is set so that when contact is made with internal threads of a standard gauge, the indicating needle will register at zero. In use, the gauge is inserted within the threads to be tested, and the operator then exerts pressure downwardly on the operating lever 41, causing the rotation of the shaft 35 and forcing the segment 25 into contact with the internal threads to be tested. The rotation of the shaft causes the indicating needle to register on the scale 55, the amount of variance with the standard desired. If the opening is larger than standard, the number of thousandths will be registered on the plus side. If the opening is smaller than standard, the number of thousandths will be registered on the minus side.

In the modification shown in Figs. 6, 7 and 8, the shaft 60 terminates in a gear 61 which engages the rack 70. A pin 71 engages a segment lever 72 pivoted at 73, while the teeth on the segment directly engage the teeth 74 on the indicating needle 75. A spring 76 tends to keep the indicating needle against the stop 77. As the operating lever rotates the shaft 60, the pin engages the end of the geared segment 72 to move the needle along the scale 78.

Instead of the rolls 20, segments 80 are provided. The segments are notched at 81 and are engaged by a set screw 82. By releasing the set screw 82, the segments 80 may be moved in and out of the legs 83 to vary the size of the gauge. With this form of head, one head may be quickly varied without the trouble of changing the rolls or making other adjustments.

In the modification shown in Figs. 9 to 13, a combined operating lever and indicator 90 is used. The member 90 operates within the opening 91 in the handle member 92 and is fastened directly to the shaft 93. The end of the member 90 is provided with a thumb piece 94 and an indicator 95, which registers with the scale 96. In this form the gauge is placed within the opening and the operator rotates the shaft by means of the thumb piece 94, noting the manner in which the indicator 95 registers with the scale.

It will be seen that I have provided an internal thread gauge which completes its measuring by the extension of a retractible member which will automatically return to the retracted position on the release of the actuating force. The movement of the extension is measured or indicated upon a scale, the graduations of which may be fixed according to convenience or accepted standards.

In my gauge there is a stationary contact and no movement of the contact points laterally to the measured surfaces. Thus, wear of the contact points is eliminated. Due to the construction of my gauge with its leg members, visual inspection of the threads may be made during measurement.

My gauge may be used to measure different openings with a slight adjustment and with the use of interchangeable heads. It will be appreciated that much greater accuracy is possible with this gauge than with plug gauges now used. Moreover, by changing the setting of the needle, any wear which does occur in the working parts may be compensated for.

While I have shown several slight modifications, they all embody the same principle, and the modifications may be combined without departing from the spirit of my invention.

I claim:

1. An internal thread gauge including a handle member and a head member, a shaft extending through said handle member into said head member, an eccentric on said shaft within said head member, teeth on said shaft within said handle member, a rack engaging said teeth adapted to rotate said shaft, an indicating needle operatively connected with said shaft to indicate the degree of rotation thereof, contact elements on said head member, one of said contact elements being slidably mounted therein and engaging said eccentric, whereby the rotation of said shaft will cause said eccentric to slide said member outwardly in said head.

2. An internal gauge comprising a head member, a plurality of contact elements on said head member, one of said contact elements being slidably mounted therein, spring means for yieldingly holding said slidable contact element retracted, indicating means showing the position of said slidable element, and means for forcing said sliding contact element outwardly in said head, said means comprising a shaft, an eccentric on said shaft engaging the inner end of said slidable contact element, and means for rotating said shaft said means including teeth on said shaft, a rack engaging said teeth, and a lever for moving said rack.

JOHN F. ANDERS.